(12) United States Patent
Charnesky

(10) Patent No.: US 8,777,295 B2
(45) Date of Patent: Jul. 15, 2014

(54) SYSTEM FOR CONTROLLING AN ACCESS OPENING IN A BODY OF A VEHICLE

(75) Inventor: Scott P. Charnesky, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 13/099,416

(22) Filed: May 3, 2011

(65) Prior Publication Data

US 2012/0280531 A1 Nov. 8, 2012

(51) Int. Cl.
*B60J 1/17* (2006.01)
*B60J 5/04* (2006.01)

(52) U.S. Cl.
USPC .......... 296/146.9; 296/146.4; 49/358; 49/506

(58) Field of Classification Search
USPC ............. 296/146.4, 146.1, 146.2, 146.9, 150; 49/358, 506
See application file for complete search history.

(56) References Cited

U.S. PATENT DOCUMENTS 7,059,654 B2 * 6/2006 Ichinose .................... 296/146.1

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A system for controlling an access opening in a vehicle body includes first and second doors arranged to selectively open and close first and second portions of the opening. The system also includes first and second latches operatively connected to the first and second doors, respectively, and configured to selectively latch the first and second doors to and release the first and second doors from the body. The system additionally includes a device operatively connected to the first door and configured to be selectively retracted before at least one of the first and second doors is opened and protracted when the first and second doors are closed to seal the opening. Furthermore, the system includes a third latch operatively connected to one of the first and second doors and configured to selectively latch the first door to the second door and release the first and second doors.

20 Claims, 4 Drawing Sheets

SYSTEM FOR CONTROLLING AN ACCESS OPENING IN A BODY OF A VEHICLE

TECHNICAL FIELD

The invention relates to a system for controlling an access opening in a body of a vehicle.

BACKGROUND

A typical vehicle has at least one access door. Such a door typically has a latch mechanism for maintaining the door in a latched or closed state until access into or egress from the vehicle is required. The latch mechanism is typically actuated by an outside door handle to gain access to the interior of the vehicle.

Some vehicles employ multiple side doors for access to the vehicle's interior. Commonly, when viewed from the front of the vehicle, such side doors are hinged proximate their front edge. Vehicles with multiple front-hinged side access doors typically employ a structural pillar, often called a B-pillar, on each side of the vehicle. Such pillars are generally situated between the access doors, and are used for mounting door hinges, as well as other various door and body hardware, thereto.

There are also vehicles that have multiple side doors, but do not employ a structural pillar between the doors. Instead, such pillar-less vehicles have a largely open space that is selectively covered and uncovered by the multiple access doors. The pillar-less configuration is often used in vehicles employing a leading access door that is hinged near its front edge, but a trailing access door that is hinged near its rear edge. The absence of a structural pillar in such vehicles, however, removes a location that is typically used for mounting various door and body hardware.

SUMMARY

A system for controlling an access opening in a body of a vehicle includes a first door arranged to selectively open and close a first portion of the access opening and a second door arranged to selectively open and close a second portion of the access opening. The system also includes a first latch operatively connected to the first door and configured to selectively latch the first door to the body when the first portion of the access opening is closed and release the first door to open the first portion of the access opening. The system additionally includes a second latch operatively connected to the second door and configured to selectively latch the second door to the body when the second portion of the access opening is closed and release the second door to open the second portion of the access opening.

The system additionally includes a device operatively connected to the first door and configured to be selectively retracted before at least one of the first and second doors is opened. The device is protracted when the first and second doors are closed to thereby seal the first and second portions of the access opening. Furthermore, the system includes a third latch operatively connected to one of the first and second doors. The third latch is configured to selectively latch the first door to the second door when the first and second portions of the access opening are closed, and to release the first and second doors to open.

The device may be configured to retract fully to clear the second door when the first door is selectively opened and closed and to retract at least partially to clear the second door when the second door is selectively opened and closed.

At least one of the first and second doors may be characterized by an absence of a header.

The vehicle body may be characterized by a front end, a rear end, a beltline, and an absence of a B-pillar. In such a case, the opening may be an entryway on a side of the vehicle, the first portion of the opening may be positioned toward the rear end of the vehicle, and the second portion of the opening may be positioned toward the front end of the vehicle. Additionally, the first door may be rear-hinged and the second door may be front-hinged. Furthermore, the third latch may be positioned proximate the beltline.

The third latch may be operatively connected to the first door. In such a case, the third latch may be operatively connected to the device and configured to selectively retract and protract with the device. Furthermore, the third latch may be configured to latch the device to the second door when the device is protracted, and to release the device from the second door before the device is retracted.

The third latch may be operatively connected to the second door. In such a case, the third latch may be further configured to latch the second door to the device when the device is protracted and to release the device from the second door before the device is retracted.

The system may also include an actuator operatively connected to the device and configured to selectively retract and protract the device. The system may additionally include a first release mechanism operatively connected to the first door and a second release mechanism operatively connected to the second door. In such a case, the operation of at least one of the first and second release mechanisms may retract the device via the actuator.

The third latch may be released before the first and second latches are released and be latched after the first and second latches are latched.

A vehicle employing the above-described system is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
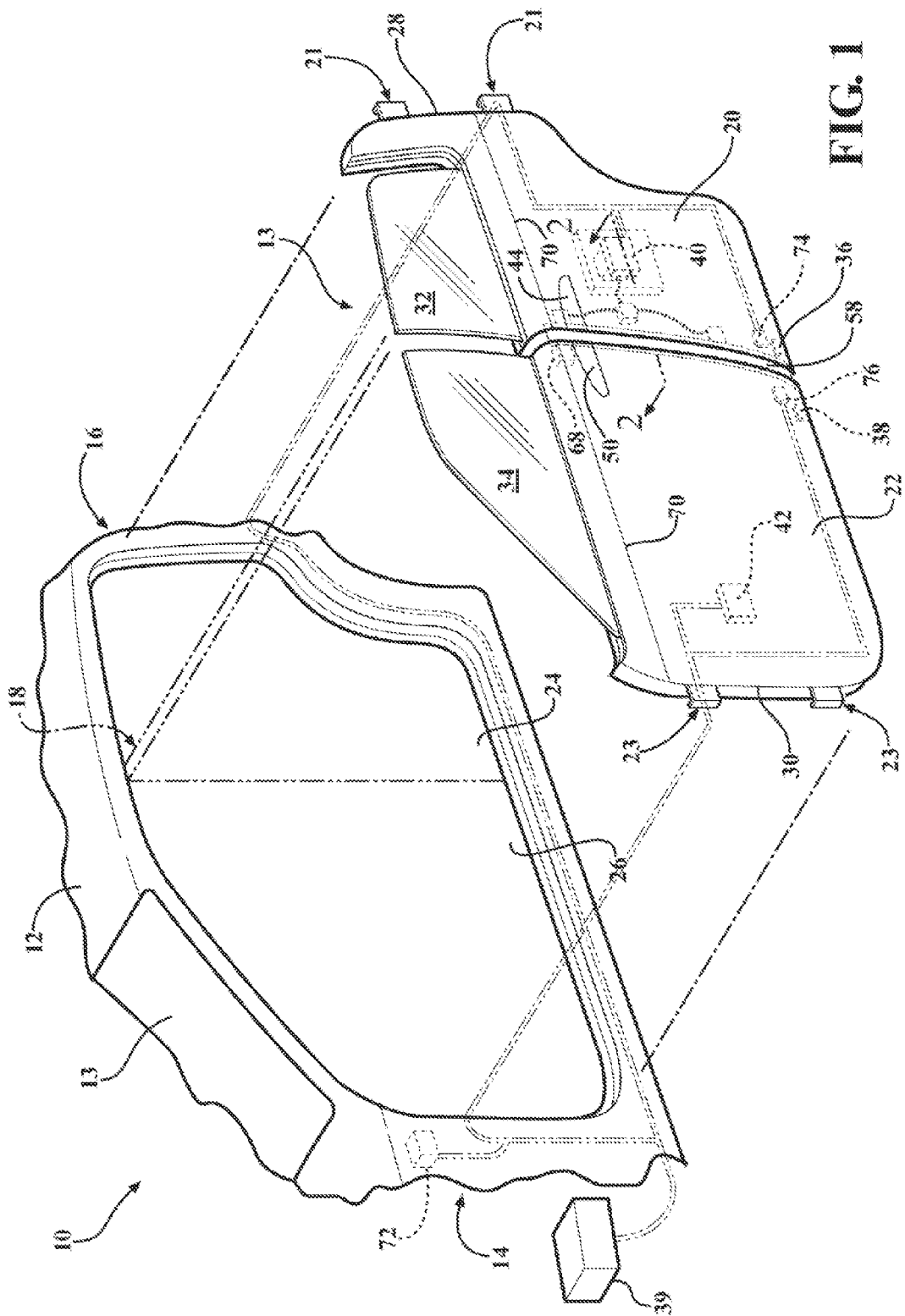
FIG. 1 is a schematic perspective exploded view of a vehicle body illustrating a header-less front-hinged side door and a header-less rear-hinged side door according to an embodiment; with both doors shown in a closed state.

Referring to the drawings, wherein like reference numbers refer to like components, FIG. 1 shows a vehicle 10. The vehicle 10 includes a vehicle body 12, as well as openings for windows and various access doors. The body 12 encloses an interior space that is adapted to accommodate vehicle passengers and their belongings. The body 12 includes a front end 14 and a rear end 16 of the vehicle and an access opening 18. The vehicle 10 also includes a system 13 for controlling or selectively opening and closing the access opening 18.

The opening 18 is adapted to provide access into the vehicle passenger compartment, i.e., is an entryway arranged on a side of the vehicle. The system 13 includes two panels, a first side door 20 and a second side door 22, that are configured to cover the opening 18. The first and second side doors 20, 22 are "independently" openable and closable, i.e., each of the first and second doors can be opened or closed regardless of the position of the other vehicle door. Although two side doors 20, 22 are shown, a body 12 adapted to employ fewer or greater number of doors is also envisioned. The opening 18 is characterized by an absence of a B-pillar, and is thus termed "continuous".

A B-pillar is a structural component that is often employed in bodies of vehicles, and is typically used for mounting miscellaneous door and body hardware, such as door hinges and wiring, and to enhance the structure of the vehicle body. Generally, whether the vehicle employs a B-pillar or not depends on the packaging and the intended use of the vehicle. The presence of a B-pillar, although useful for providing a structural benefit, may restrict entry into the vehicle. Thus, an absence of a B-pillar is not unusual in vehicles that employ a tightly packaged passenger compartment along with reduced width side doors, such as compact vehicles, and may also be encountered in work vehicles, such as trucks.

The first side door 20 is arranged to selectively open and close a first portion 24 of the opening 18, and second side door 22 is arranged to selectively open and close a second portion 26 of the opening 18. As configured, the second portion 26 of the opening 18 is a portion of the access opening that may remain uncovered or open when the first portion 24 is covered by the first door 20. The first portion 24 is positioned toward the rear end 16 of the body 12, and the second portion 26 is positioned toward the front end 14 of the body. The first door 20 is pivotably attached to the body 12 via hinges 21 at its rear or trailing edge 28, while the second door 22 is pivotably attached to the body 12 via hinges 23 at its front or leading edge 30. The first door 20 is termed as being rear-hinged, while the second door 22 is termed as being front-hinged. When opened, the first door 20 swings toward the rear end 16 of the body 12, while the second door 22 swings toward the front end 14, and are, thus, arranged as opposite swinging doors.

A window 32 is mounted on the first door 20, while a window 34 is mounted on the second door 22. The term "mounted on" is employed herein to denote mounting on the door directly or with respect to the door, such as via a separate, auxiliary component. Each of the windows 32 and 34 may be adjustable for height on demand from a passenger of the vehicle.

Each of the first and rear doors 20, 22 is characterized by an absence of a door header. As used herein, a door header is an upper portion of the vehicle door frame that is configured to provide upper structural support to the door window. Such a header may also provide a rigid structure for fitting into the upper area of the access opening in the body of the vehicle. In the absence of such a header, the subject door retains its lower structural portion for fitting into the lower area of the access opening, but is also required to rely on the door window for fitting into the upper area in order to fully block the subject access opening. Accordingly, as shown in FIG. 1, the first door 20 is header-less, i.e., is characterized by the absence of a header, and thus closes the upper area of the first portion 24 of the opening 18 via the window 32. Furthermore, as also shown in FIG. 1, the second door 22 is similarly header-less, and thus closes the upper area of the second portion 26 via the window 34.

The system 13 additionally includes a first latch 36 and a second latch 38. As may be seen in FIG. 1, the first latch 36 is mounted at the bottom of the first door 20, while the second latch 38 is mounted at the bottom of the second door 22. The first latch 36 is arranged to selectively latch the first door 20 to the body 12 when the first door is closed, and release the first door to open the first portion 24 of the opening 18. Similarly, the second latch 38 is arranged to selectively latch the second door 22 to the body 12 when the second door is closed, and release the second door to open the second portion 26 of the opening 18. An electric motor 40 is mounted on the first door 20, while an electric motor 42 is mounted on the second door 22. The latch 36 is releasable on demand by the electric motor 40, while the latch 38 is releasable on demand by the electric motor 42.

The motor 40 is operated via a command received either from a first release mechanism 44, such as a lever or a button located on an exterior surface 46 of the first door 20, or via a second release mechanism (not shown) located on an interior surface 48 of the first door. Similarly, the motor 42 is operated via a command received either from a third release mechanism 50, such as a lever or a button located on an exterior surface 52 of the second door 22, or via a fourth release mechanism (not shown) located on an interior surface 54 of the second door. The motors 40 and 42 are each electrically connected to and receive power from an energy source 39, such as a battery or a generator. The operation of the motors 40 and 42 may be regulated by a controller 72 arranged on the vehicle body 12.

Figure 2:
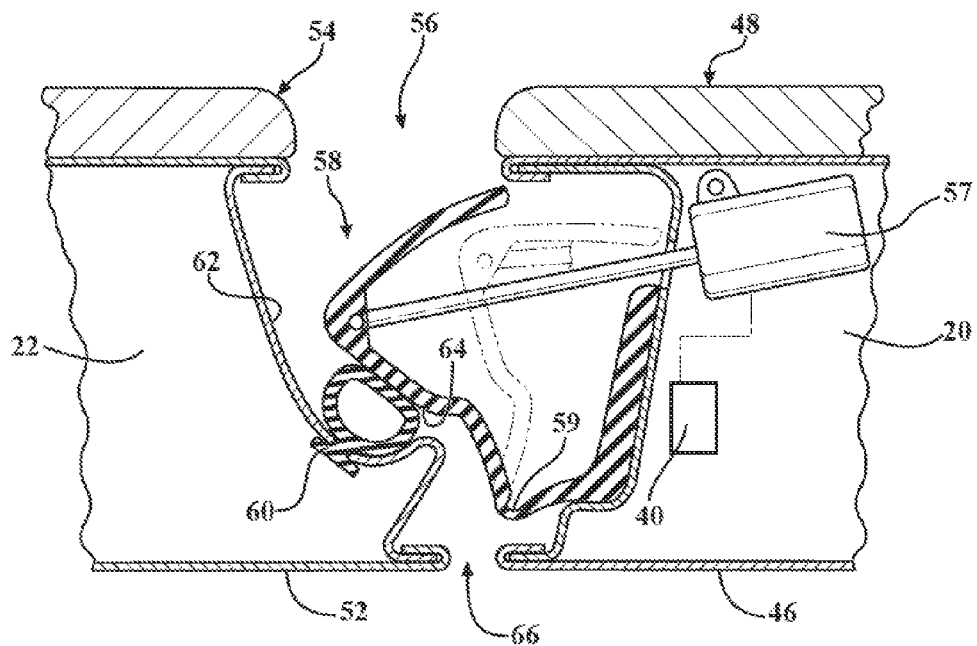
FIG. 2 is a schematic sectional top view of a portion of the side doors taken at line 2-2 of FIG. 1, depicting the side doors in a closed state and a device in a protracted state for sealing the doors.
Figure 3:
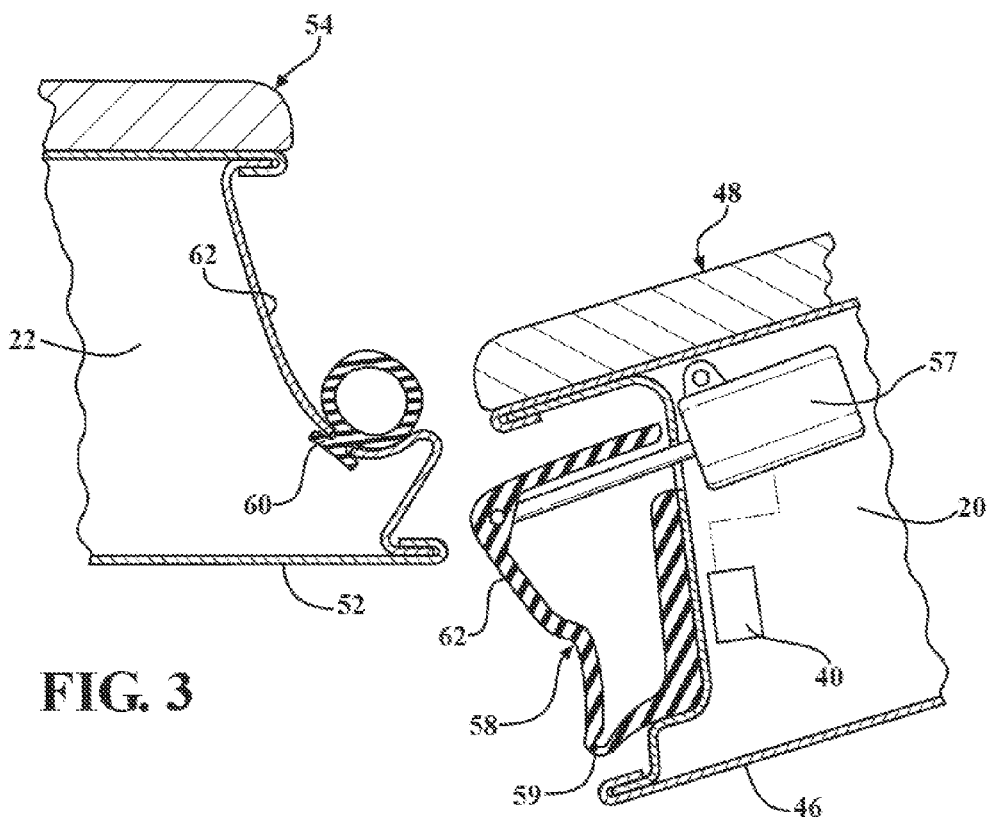
FIG. 3 is a schematic sectional top view of a portion of the side doors shown in FIG. 1, depicting the rear-hinged door in an open state and the front-hinged door in a closed state, and the device in a refracted state.
Figure 4:
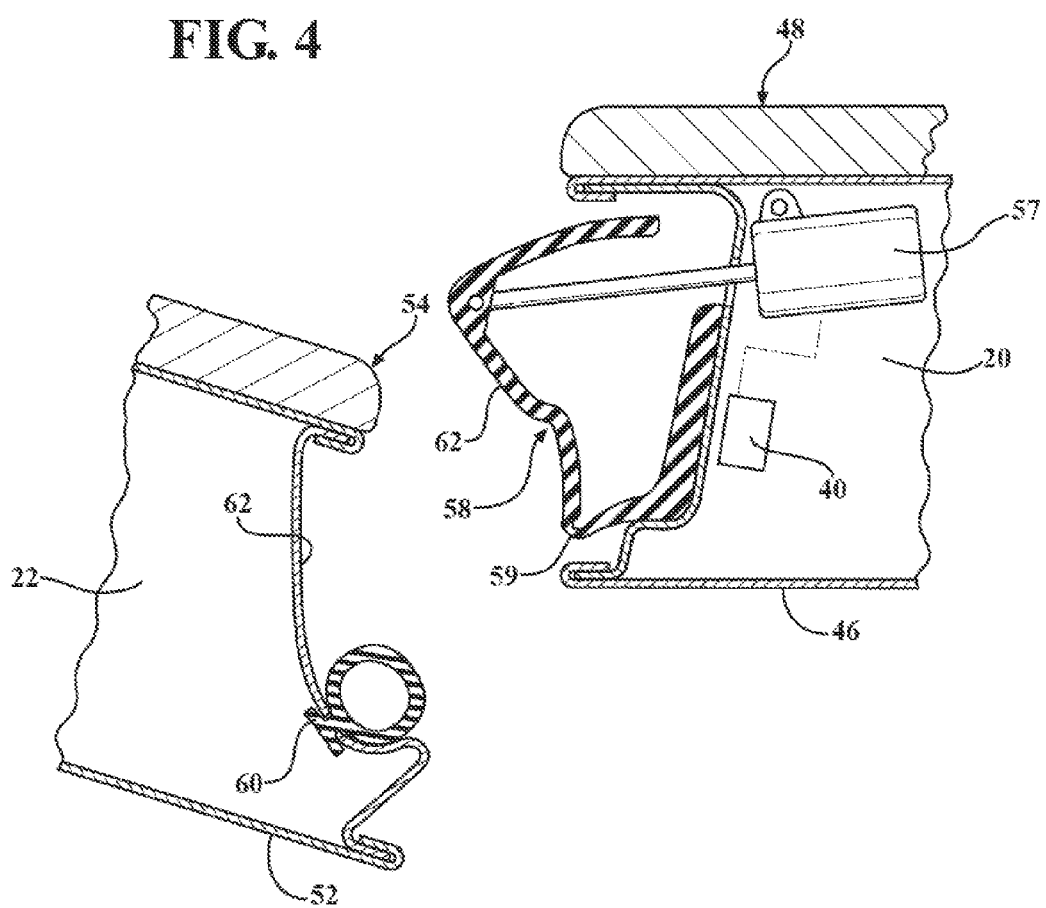
FIG. 4 is a schematic sectional top view of a portion of the side doors shown in FIG. 1, depicting the rear-hinged door in a closed state and the front-hinged door in an open state, and the device in a retracted state.

When the doors 20 and 22 are closed, an opening 56 remains there between, as shown in FIG. 1. FIGS. 2-4 show top view of the vehicle body 12, as seen along a cross section 2-2 depicted in FIG. 1. The system 13 also includes a device 58 operatively connected to the first door 20 and configured to be selectively retracted before at least one of the first and second doors 20, 22 is opened. The device 58 is also configured to be protracted when the first and second doors 20, 22 are closed to thereby seal the first and second portions 24, 26 of the access opening 18. The articulation of the device 58 is illustrated in FIGS. 2-3, wherein FIG. 2 depicts the first and second doors 20, 22 in a closed state, while FIG. 3 depicts the first door 20 in the process of being opened while the second door remains closed. FIG. 4 depicts the second door 20 in the process of being opened while the first door 20 remains closed. When the device 58 is protracted, i.e., when both first and second doors 20, 22 are closed, the device covers or fills the opening 56.

The protraction and retraction of the device 58 is accomplished via an actuator 57, which may be an electromechanical device such as a solenoid. As shown in FIGS. 2-4, the second door 22 includes a compliant sealing member 60 adapted to be compressed by the device 58 and seal the opening 18 shown in FIG. 1 when the first door 20 and the second door 22 are closed. In the alternative, the sealing member 60 may be operatively connected to the device 58 (not shown), and thus be articulated therewith. The sealing member 60 is a weather strip that is mounted to a side surface 62 of the second door 22.

As shown in FIGS. 2-4, a surface 64 of the device 58 is adapted to engage and compress the sealing member 60 for seamless contact therewith when the first and second doors 20, 22 are closed. As shown in FIG. 2, when both the first and the second doors 20, 22 are closed, the first and second doors substantially cover the device 58, leaving but a narrow gap 66 between the exterior surfaces 46 and 52. Thus, with the aid of the sealing member 60, when the device 58 is in its protracted position, the device blocks the passage from the gap 66 to the interior surfaces 48, 54. In the event that the sealing member 60 is operatively connected to the device 58, by protracting the device the sealing member may be compressed against the edges of both the first and second doors 20, 22 proximately to the exterior surfaces 46, 52, thus filling the gap 66. The device 58 also fills the opening 56 to protect the interior space of the vehicle 10 from external moisture and dust.

The device 58 includes at least one hinge 59 that is configured to permit the device to be articulated, i.e., protracted or retracted, as necessary. Each hinge 59 may either be configured as a "living" hinge that is formed from the same material and together with the device 58, or as a compound arrangement, as deemed appropriate. The device 58 may be configured to retract fully to clear the second door 22 when the first door 20 is selectively opened and closed, and be configured to retract at least partially to clear the second door when the second door is selectively opened and closed. As may be seen from FIGS. 2 and 4, it may be sufficient for the device 58 to retract only partially when the second door 22 is either opened or closed because the interior surface 54 of the second door begins to move away from the device shortly after the second door begins to swing. On the other hand, as may be seen from FIGS. 2 and 3, it may be insufficient for the device 58 to retract only partially when the first door 20 is either opened or closed because the device continues to move toward the exterior surface 52 of the second door during an extended part of its trajectory after the first door begins to swing. Accordingly, full retraction of the device 58 may be required for clearing the second door 22 when the first door 20 is being operated.

As shown in FIG. 1, the system 13 also includes a third latch 68. As additionally shown in FIG. 1, the vehicle body 12 is characterized by a beltline 70 and the third latch 68 is positioned proximate the beltline. A beltline on a body of a vehicle is generally the topmost horizontal line that appears below the vehicle's greenhouse or window area. In conjunction with the positioning of the first and second latches 36, 38 at the bottom of the first and second doors 20, 22, respectively, the positioning of the third latch proximate the beltline 70 is intended to provide a robust and efficient scheme for latching the first and second doors within the access opening 18. The third latch 68 may be released before the first and second latches 36, 38 are released, and may be latched after the first and second latches are latched. Such an order of releasing and latching the first, second, and third latches 36, 38, 68 may be used to provide an effective and error-proof method of sealing the access opening 18.

Figure 5:
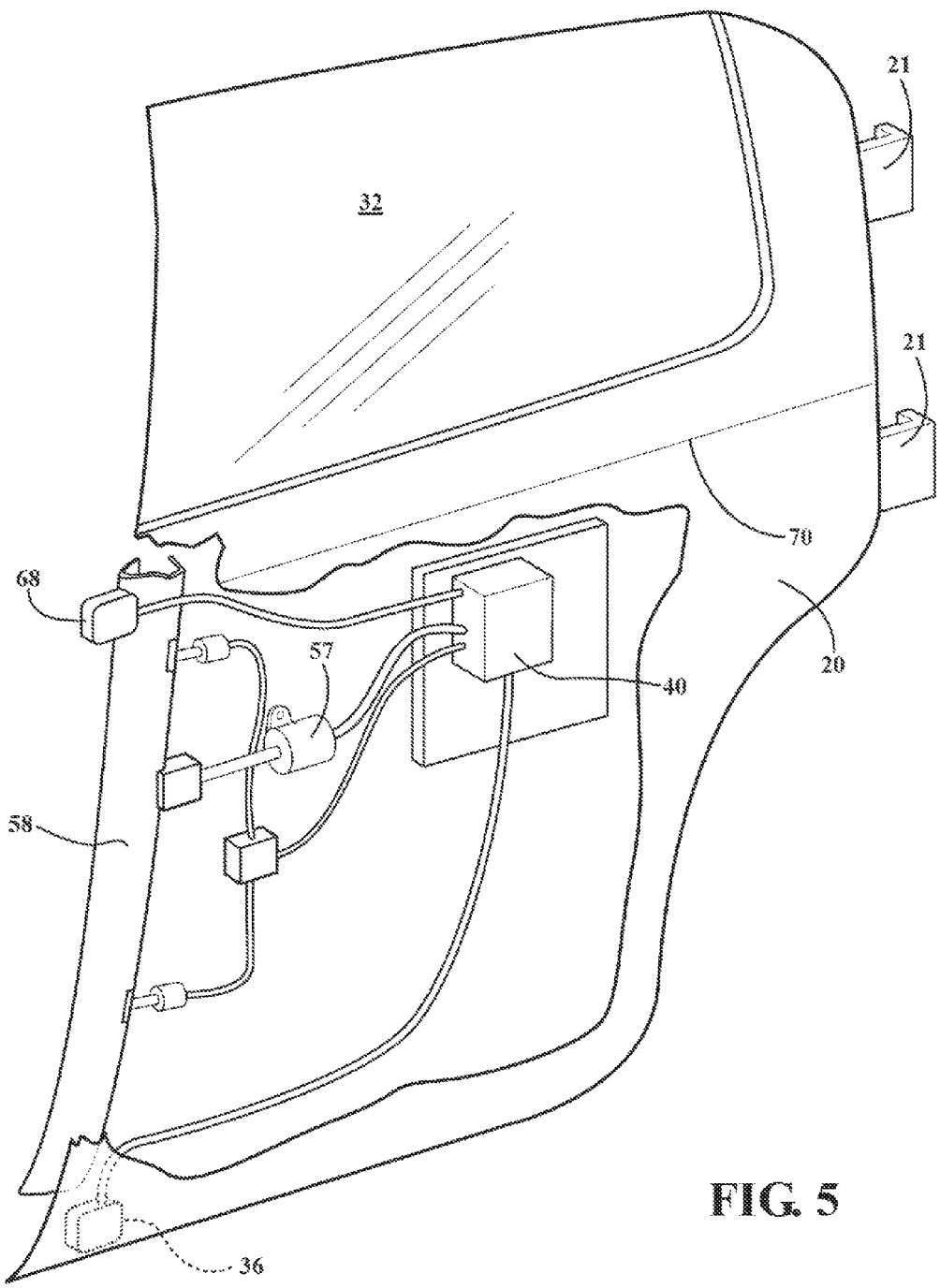
FIG. 5 is a schematic partial cut-away view of the rear-hinged side door shown in FIG. 1, the rear-hinged side door employing a retractable device and a latch operatively connected to the device.

As shown in FIG. 5, the third latch 68 is operatively connected to the device 58. Although not shown, the third latch may also be operatively connected to the second door 22. Regardless whether the third latch 68 is connected to the first door 20 or to the second door 22, the third latch is configured to selectively latch the first door to the second door when the first and second portions 24, 26 of the access opening 18 are closed. Furthermore, the third latch 68 is configured to release the first and second doors 20, 22 to permit them to open. When the third latch 68 is operatively connected to the device 58, as shown in FIG. 5, the third latch is configured to selectively retract and protract with the device. Additionally, the third latch 68 is configured to latch the device 58 to the second door 22 when the device is protracted and to release the device from the second door before the device is retracted. On the other hand, when the third latch 68 is operatively connected to the second door 22, the third latch is configured to latch the second door to the device 58 when the device is protracted and to release the device from the second door before the device is retracted. Furthermore, additional latches may be provided to latch the first door 20 to the second door 22 as may be deemed beneficial.

Referring back to FIG. 1, the operation of the motor 40 may be regulated by a controller 72 arranged on the body 12. Accordingly, the controller 72 may be programmed to coordinate the release of the first, second, and third latches 36, 38, and 68, and the retraction of the device 58 via the motor 40. Additionally, continuous detection of whether each of the first and second doors 20, 22 is open or closed may be implemented to facilitate the retraction and protraction of the device 58, as well as the releasing of the first, second, and third latches 36, 38, and 68 at appropriate instances.

In furtherance of such an objective, a sensor 74 may be employed to detect the position of the first door 20, while a sensor 76 may be employed to detect the position of the second door 22, as shown in FIG. 1. The sensors 74 and 76 may be configured to communicate the detected position of the first and second doors 20, 22, respectively, to the controller 72 for appropriate control of the motor 40. The sensors 74 and 76 may have any appropriate configuration to affect the required detection of the position of the first and second doors 20, 22, such as electro-mechanical switches or optical proximity sensors. Additionally, the sensor 74 may be incorporated into the first latch 36, while the sensor 76 may be incorporated into the second latch 38.

As shown in FIG. 5, the device 58 may be mounted on the first door 20. Although not specifically shown, the device 58 may similarly be mounted on the second door 22. The device 58 may likewise be employed to seal two opposite swinging doors on a rear end of a vehicle, as occasionally used for access to storage compartments in vans, station wagons, and sport utility vehicles (SUVs).

While the best modes for carrying out the invention have been described in detail, those familiar with the art to which this invention relates will recognize various alternative designs and embodiments for practicing the invention within the scope of the appended claims.

The invention claimed is:

1. A system for controlling an access opening in a body of a vehicle, the system comprising:
    a first door arranged to selectively open and close a first portion of the access opening;
    a second door arranged to selectively open and close a second portion of the access opening;
    a first latch operatively connected to the first door and configured to selectively latch the first door to the body when the first portion of the access opening is closed, and to release the first door to open the first portion of the access opening;
    a second latch operatively connected to the second door and configured to selectively latch the second door to the body when the second portion of the access opening is closed, and to release the second door to open the second portion of the access opening;
    a device operatively connected to the first door and configured to be selectively retracted before at least one of the first and second doors is opened and protracted when the first and second doors are closed to thereby seal the first and second portions of the access opening; and
    a third latch operatively connected to one of the first and second doors and configured to selectively latch the second door to the device when the first and second portions of the access opening are closed, to release the device from the second door before the device is retracted, and to release the first and second doors to open.

2. The system of claim 1, wherein the device is configured to retract fully to clear the second door when the first door is selectively opened and closed and to retract at least partially to clear the second door when the second door is selectively opened and closed.

3. The system of claim 2, wherein at least one of the first and second doors is characterized by an absence of a header.

4. The system of claim 3, wherein the vehicle body is characterized by a front end, a rear end, a beltline, and an absence of a B-pillar, and wherein:
the opening is an entryway on a side of the vehicle;
the first portion of the opening is positioned toward the rear end of the vehicle and the second portion of the opening is positioned toward the front end of the vehicle;
the first door is rear-hinged;
the second door is front-hinged; and
the third latch is positioned proximate the beltline.

5. The system of claim 1, wherein when the third latch is operatively connected to the first door, the third latch is operatively connected to the device and is configured to selectively retract and protract with the device, such that the third latch is configured to latch the device to the second door when the device is protracted.

6. The system of claim 1, wherein the third latch is:
operatively connected to the second door; and
configured to latch the second door to the device when the device is protracted.

7. The system of claim 1, further comprising an actuator operatively connected to the device and configured to selectively retract and protract the device.

8. The system of claim 7, further comprising:
a first release mechanism operatively connected to the first door; and
a second release mechanism operatively connected to the second door;
wherein the operation of at least one of the first and second release mechanisms retracts the device via the actuator.

9. The system of claim 1, wherein the third latch is released before the first and second latches are released and is latched after the first and second latches are latched.

10. A vehicle comprising:
a vehicle body having a front end and a rear end, and defining an access opening; and
a system for sealing the access opening, the system having:
a first door arranged to selectively open and close a first portion of the access opening;
a second door arranged to selectively open and close a second portion of the access opening;
a first latch operatively connected to the first door and configured to selectively latch the first door to the body when the first portion of the access opening is closed, and to release the first door to open the first portion of the access opening;
a second latch operatively connected to the second door and configured to selectively latch the second door to the body when the second portion of the access opening is closed, and to release the second door to open the second portion of the access opening;
a device operatively connected to the first door and configured to be selectively retracted before at least one of the first and second doors is opened and protracted when the first and second doors are closed to thereby seal the first and second portions of the access opening; and
a third latch operatively connected to one of the first and second doors, and configured to selectively latch the second door to the device when the first and second portions of the access opening are closed, to release the device from the second door before the device is retracted, and to release the first and second doors to open.

11. The vehicle of claim 10, wherein the device is configured to retract fully to clear the second door when the first door is selectively opened and closed and to retract at least partially to clear the second door when the second door is selectively opened and closed.

12. The vehicle of claim 11, wherein at least one of the first and second doors is characterized by an absence of a header.

13. The vehicle of claim 12, wherein the vehicle body is characterized by an absence of a B-pillar, and wherein:
the opening is an entryway on a side of the vehicle;
the first portion of the opening is positioned toward the rear end of the vehicle and the second portion of the opening is positioned toward the front end of the vehicle;
the first door is rear-hinged; and
the second door is front-hinged.

14. The vehicle of claim 13, wherein the vehicle body is characterized by a beltline and the third latch is positioned proximate the beltline.

15. The vehicle of claim 10, wherein when the third latch is operatively connected to the first door, the third latch is operatively connected to the device and is configured to selectively retract and protract with the device, such that the third latch is configured to latch the device to the second door when the device is protracted.

16. The vehicle of claim 10, wherein the third latch is operatively connected to the second door, the third latch is further configured to latch the second door to the device when the device is protracted.

17. The vehicle of claim 10, further comprising an actuator operatively connected to the device and configured to selectively retract and protract the device.

18. The vehicle of claim 17, further comprising a first release mechanism operatively connected to the first door and a second release mechanism operatively connected to the second door, the operation of at least one of the first and second release mechanisms retracts the device via the actuator.

19. The vehicle of claim 10, wherein the third latch is released before the first and second latches are released and is latched after the first and second latches are latched.

20. A vehicle comprising:
a body having a front end and a rear end, characterized by a beltline and an absence of a B-pillar, and defining an access opening on a side of the vehicle; and
a system for sealing the access opening, the system having:
a first door arranged to selectively open and close a first portion of the access opening, wherein the first door is rear-hinged and the first portion of the opening is positioned toward the rear end of the vehicle;
a second door arranged to selectively open and close a second portion of the access opening, wherein the second door is front-hinged and the second portion of the opening is positioned toward the front end of the vehicle;
a first latch operatively connected to the first door and configured to selectively latch the first door to the body when the first portion of the access opening is closed, and to release the first door to open the first portion of the access opening;

a second latch operatively connected to the second door and configured to selectively latch the second door to the body when the second portion of the access opening is closed, and to release the second door to open the second portion of the access opening;

a device operatively connected to the first door and configured to be selectively retracted before at least one of the first and second doors is opened and protracted when the first and second doors are closed to thereby seal the first and second portions of the access opening; and a third latch operatively connected to the device, such that the third latch is configured to selectively retract and protract with the device, to latch the device to the second door when the device is protracted, and to release the device from the second door before the device is retracted;

wherein:
the device is configured to retract fully to clear the second door when the first door is selectively opened and closed and to retract at least partially to clear the second door when the second door is selectively opened and closed;

at least one of the first and second doors is characterized by an absence of a header; and the third latch is positioned proximate the beltline.

* * * * *